No. 741,261. PATENTED OCT. 13, 1903.
H. LEDERMANN.
AIR BRAKE FOR MOTOR ROAD VEHICLES.
APPLICATION FILED JAN. 20, 1903.
NO MODEL. 3 SHEETS—SHEET 1.
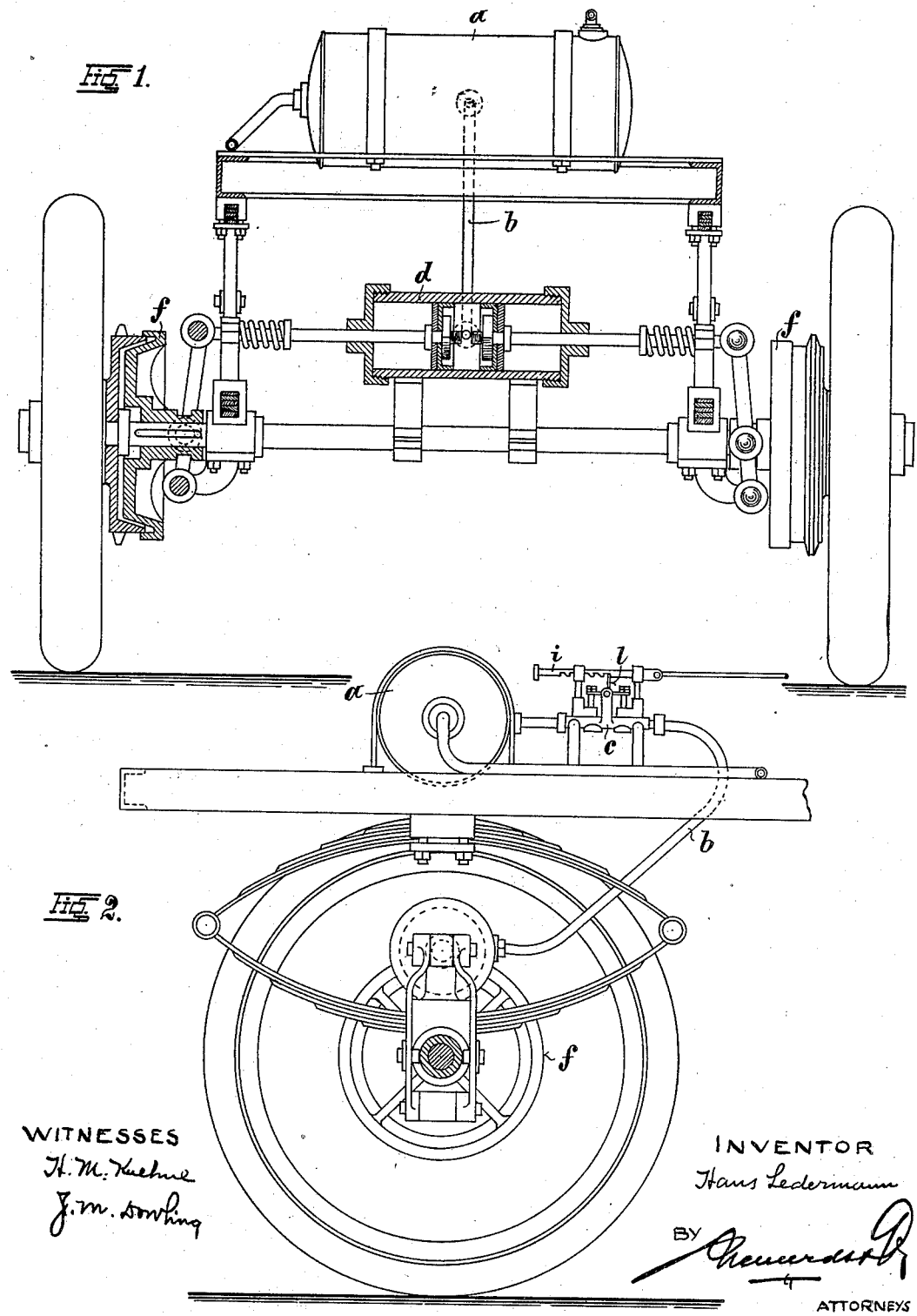

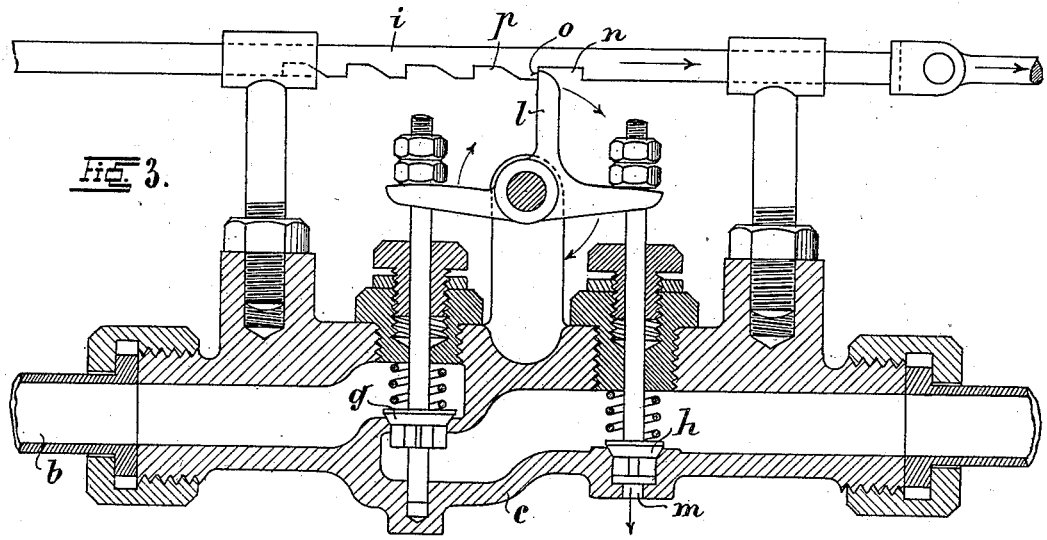
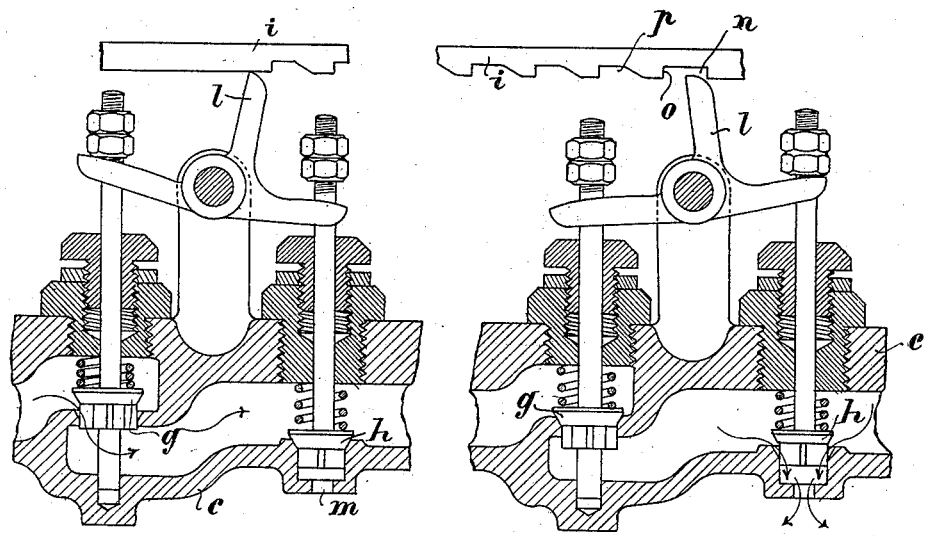

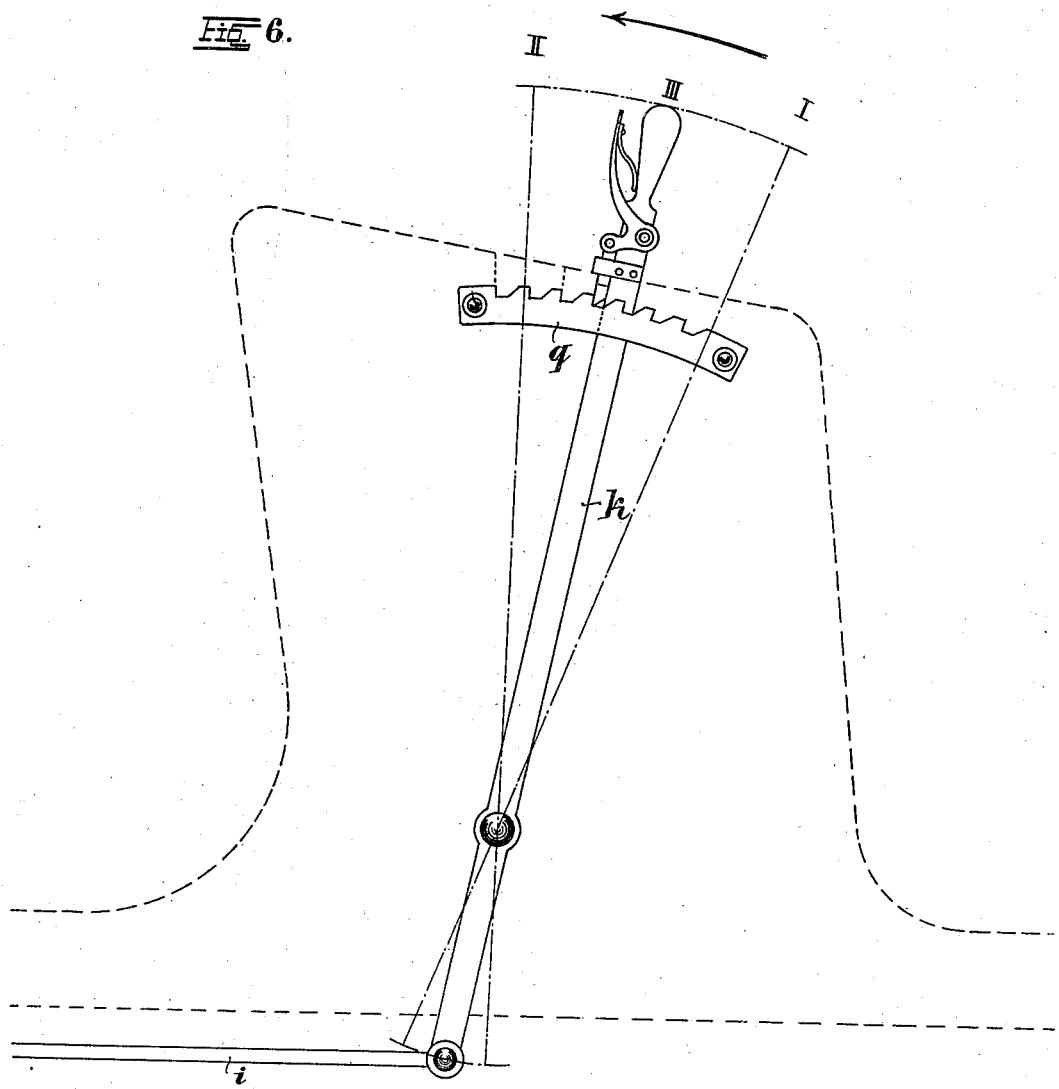

No. 741,261. Patented October 13, 1903.

UNITED STATES PATENT OFFICE.

HANS LEDERMANN, OF NEUMARKT, GERMANY.

AIR-BRAKE FOR MOTOR ROAD-VEHICLES.

SPECIFICATION forming part of Letters Patent No. 741,261, dated October 13, 1903.

Application filed January 20, 1903. Serial No. 139,825. (No model.)

*To all whom it may concern:*

Be it known that I, HANS LEDERMANN, landowner, of Schloss Lobetinz, Kreis Neumarkt, in the Province of Silesia, Germany, have invented new and useful Improvements in Air-Brakes for Motor Road-Vehicles, of which the following is a full and clear description.

This invention consists of improvements in air-brakes for motor road-vehicles.

The invention will be understood from the following description of apparatus embodying the same and upon reference to the accompanying drawings.

Figure 1 is a vertical section of a motor-car, illustrating, by way of example, a constructional form of the braking apparatus. Fig. 2 is a corresponding side elevation of the front end of the vehicle, the front wheel being omitted. Figs. 3, 4, and 5 illustrate the function of the air-inlet and air-outlet valves on the pressure-cylinder. Fig. 6 shows the operating handle or lever.

The requisite compression or rarefaction of the air for operating the brake is produced in the vessel $a$ by means of a pump which is coupled in a suitable manner to the motor. The air passes into the brake-cylinder $d$ through the pipe $b$, in which the double valve $c$ is arranged. When the air is admitted into the cylinder $d$, there is produced in the hitherto usual manner a movement of a piston which acts upon the brake $f$, of any suitable construction.

The double valve $c$ comprises the air-inlet valve $g$ and the air-outlet valve $h$. The operation of the valves is effected by means of the toothed bar $i$, which is caused to move by the rotation of the hand-lever $k$. The movement of the bar $i$ causes an oscillation of the tappet $l$, which produces a rising or a depression of the valve-plugs $g$ $h$. When the brake is not in operation, the hand-lever $k$ is situated in the position I. (Shown in Fig. 6.) This position of the hand-lever corresponds with the position of the valves shown in Fig. 5, in which the inlet-valve $g$ is resting on its seat, while the outlet-valve $h$ is raised off its seat. In this case the interior of the brake-cylinder $d$ is in communication with the atmosphere through the aperture $m$. When the lever is moved from the position I in the direction of the arrow, as shown in Fig. 6, (and this will take place when it is desired to operate the brake,) there will first take place a movement of the bar $i$ in the direction of the arrow, as shown in Fig. 3. The vertical arm of the tappet $l$ moves first into the notch $n$ in the bar $i$. Consequently the spring above the valve $h$ is able to act and force the valve down upon its seat, and thereby shut off the brake-cylinder from the atmosphere. When the bar $i$ has moved to such an extent that the edge $o$ of the first notch $n$ strikes against the tappet $l$, Fig. 3, then the farther movement of the bar $i$ will produce an initial opening movement of the valve $g$ for a short period of time, and thus a determined quantity of compressed air can enter the brake-cylinder $d$, so as either to fill the cylinder without producing a braking action or to produce a very slight braking action. If now the bar $i$ be moved still farther and the vertical arm of the tappet $l$ enters the next notch $p$, this set of operations will be repeated, and such will also be the case at every succeeding notch in the bar $i$. By means of each notch a further determined amount of compressed air will always enter the brake-cylinder, so that as the bar $i$ is moved along the braking action in the cylinder $d$ will be increased; but the brake-cylinder is cut off from the vessel $a$ as soon as the vertical arm of the tappet $l$ comes into a notch or tooth-space. When the last tooth-space has slid away over the tappet $l$, Fig. 4, the valve $g$ remains open, and in such a case the communication between the brake-cylinder and the compressed-air vessel $a$ is restored.

When it is desired to put the brakes "on," the driver is enabled to adjust the force of the braking action with exactness by moving the lever $k$ into one of the notches in the curved rack (the spacing of the curved rack $q$, Fig. 6, corresponding with the arrangement of the notches in the bar $i$.) According to the pressure which obtains in the vessel $a$ and which can be read off without any trouble by the driver it will either be sufficient at high pressure to turn the lever $k$ through a small distance or with low pressure it will be necessary to turn the lever $k$ through a greater distance. If the valve $g$ were not closed by each notch in the bar $i$, the full pressure which obtains in the vessel $a$ would also obtain in the brake-cylinder $d$, and then the braking action could not be regulated according to desire.

Having now particularly described and ascertained the nature of my said invention, and in what manner the same is to be performed, I declare that what I claim is—

1. In an air-brake for motor-vehicles, the combination with the brake-cylinder, of a compressed-air reservoir having a pipe thereto, a valve controlling the passage of air through said pipe, a valve controlling the exhaust of air from said cylinder, and means for successively opening and closing the first-named valve while the exhaust-valve is closed, substantially as described.

2. In an air-brake for motor-vehicles, the combination with the brake-cylinder and reservoir for compressed air, of a pipe connecting said reservoir and cylinder, a reciprocating inlet-valve controlling the passage of air through said pipe, an exhaust-port for permitting air to escape from said cylinder, a reciprocating valve controlling said port, a tappet adapted to be engaged with either of said valves to open the same, and means whereby the tappet may be operated to successively open and close the inlet-valve while the exhaust-valve remains closed, substantially as described.

3. In an air-brake for motor-vehicles, the combination with the brake-cylinder and reservoir for compressed air, of a pipe connecting said reservoir and cylinder, a reciprocating inlet-valve controlling the passage of air through said pipe, an exhaust-port for permitting air to escape from said cylinder, a reciprocating valve controlling said port, a tappet adapted to be engaged with either of said valves to open the same, a reciprocating bar having a series of notches and a projection or arm on the tappet adapted to be operated by said notches, substantially as described.

In witness whereof I have hereunto set my hand in presence of two witnesses.

HANS LEDERMANN.

Witnesses:
  RUDOLF FRIESS,
  ERNST KATZ.